(12) United States Patent
Izuo et al.

(10) Patent No.: US 7,786,541 B2
(45) Date of Patent: Aug. 31, 2010

(54) SEMICONDUCTOR PRESSURE SENSOR AND ITS FABRICATION METHOD

(75) Inventors: Shinichi Izuo, Chiyoda-ku (JP); Motohisa Taguchi, Chiyoda-ku (JP); Akira Yamashita, Chiyoda-ku (JP); Yukihisa Yoshida, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 12/067,426

(22) PCT Filed: Aug. 30, 2006

(86) PCT No.: PCT/JP2006/317053
§ 371 (c)(1),
(2), (4) Date: Mar. 19, 2008

(87) PCT Pub. No.: WO2007/058010
PCT Pub. Date: May 24, 2007

(65) Prior Publication Data
US 2009/0140355 A1    Jun. 4, 2009

(30) Foreign Application Priority Data
Nov. 15, 2005    (JP)    ............... 2005-330182

(51) Int. Cl.
*H01L 29/84* (2006.01)
(52) U.S. Cl. .................. 257/419; 257/415; 438/53; 73/715
(58) Field of Classification Search ................. 257/419, 257/415; 438/53; 73/715
See application file for complete search history.

(56) References Cited
FOREIGN PATENT DOCUMENTS

| JP | 62 163740 | 10/1987 |
|---|---|---|
| JP | 4 9770 | 1/1992 |
| JP | 2000 28457 | 1/2000 |
| JP | 2001 358345 | 12/2001 |
| JP | 2002 350259 | 12/2002 |

*Primary Examiner*—Tu-Tu V Ho
(74) *Attorney, Agent, or Firm*—Oblon, Spivak, McClelland, Maier & Neustadt, L.L.P.

(57) ABSTRACT

A semiconductor pressure sensor comprises a silicon support substrate (1), an insulating layer (2) formed on the silicon support substrate (1), and a silicon thin plate (3) formed on the insulating layer (2). A through-hole (1a) extending in the thickness direction of the silicon support substrate (1) is formed in the silicon support substrate (1). The silicon thin plate (3) located on an extension of the through-hole (1a) functions as a diaphragm (23) that is deformed by an external pressure. The insulating layer (2) remains over the entire lower surface of the diaphragm (23). The thickness of the insulating layer (2) decreases from the peripheral portion toward the central portion of the diaphragm (23). This provides the semiconductor pressure sensor capable of reducing both the offset voltage and the variation of output voltage caused by the variation of temperature and its fabrication method.

7 Claims, 6 Drawing Sheets

OFFSET VOLTAGE (NORMALIZED VALUE)

VARIATION OF OUTPUT VOLTAGE RESULTING FROM TEMPERATURE CHANGE (NORMALIZED VALUE)

◇ CONVENTIONAL PRESSURE SENSOR A
☐ CONVENTIONAL PRESSURE SENSOR B
△ PRESSURE SENSOR ACCORDING TO EMBODIMENT

◇ PRESSURE SENSOR AT THE TIME WHEN ETCHING TIME IS FIXED TO 4 MINUTES AND ONLY SECTIONAL SHAPE OF FILM IS CHANGED

☐ PRESSURE SENSOR HAVING RECESS FORMED IN SILICON OXIDE FILM BY WET ETCHING SHOWN IN FIG. 9

SEMICONDUCTOR PRESSURE SENSOR AND ITS FABRICATION METHOD

TECHNICAL FIELD

The present invention relates to a semiconductor pressure sensor and a method of fabricating the same.

BACKGROUND ART

A semiconductor pressure sensor having a diaphragm formed by a semiconductor thin plate is fabricated in general. For example, Japanese Patent Laying-Open No. 04-009770 discloses a semiconductor pressure sensor constituted of three layers, i.e., a silicon thin plate, an insulating layer and a silicon support substrate. In this semiconductor pressure sensor, a through-hole is formed in the silicon support substrate, and another through-hole continuous with this through-hole is formed in the insulating layer. On the other hand, Japanese Patent Laying-Open No. 2002-350259 discloses a semiconductor pressure sensor having a silicon support substrate provided with a through hole and an insulating layer not provided with a through-hole but remaining in a state at the time of formation of an SOI (Silicon On Insulator) substrate.

In each of the aforementioned semiconductor pressure sensors, the silicon thin plate positioned on an extension of the through-hole provided in the silicon support substrate functions as a diaphragm deformed by a pressure.

Patent Document 1: Japanese Patent Laying-Open No. 04-009770

Patent Document 2: Japanese Patent Laying-Open No. 2002-350259

DISCLOSURE OF THE INVENTION

Problems to be Solved by the Invention

The semiconductor pressure sensor disclosed in the aforementioned Japanese Patent Laying-Open No. 04-009770 has such a structure that the insulating layer is not present on a region under the diaphragm but present on the remaining region. According to this structure, the region provided with the insulating layer and the region provided with no insulating layer are intermingled with each other, whereby residual stress may be caused in the diaphragm. When the temperature of the environment of the semiconductor pressure sensor changes, stress resulting from the difference between the thermal expansion coefficients of the insulating layer and silicon is caused in the diaphragm. Therefore, a measurement error results from the temperature change in the environment.

On the other hand, the semiconductor pressure sensor disclosed in Japanese Patent Laying-Open No. 2002-350259 has such a structure that the insulating layer of a uniform thickness remains on the region under the diaphragm. According to this structure, an error in pressure measurement resulting from the difference between the thermal expansion coefficients of the insulating layer and silicon is suppressed. However, the diaphragm is strained due to stress caused in the insulating layer. In other words, the diaphragm is deformed due to a factor other than a pressure externally applied to the diaphragm. Therefore, the value of a voltage output from the semiconductor pressure sensor does not reach zero even if no pressure is applied to the diaphragm. In other words, the output voltage value is offset. Therefore, a measurement error results from the offset voltage.

The present invention has been proposed in consideration of the aforementioned problems, and an object thereof is to provide a semiconductor pressure sensor suppressing both of a measurement error resulting from an offset voltage and a measurement error resulting from a temperature change in the environment and a method of fabricating the same.

Means for Solving the Problems

The semiconductor pressure sensor according to the present invention comprises a semiconductor support substrate provided with a through-hole extending in the thickness direction and a semiconductor thin plate positioned on the semiconductor support substrate. This pressure sensor further comprises an insulating layer held between the semiconductor support substrate and the semiconductor thin plate. The insulating layer has a recess on a position facing the through-hole, and the thickness on the position of the recess decreases from the peripheral portion toward the central portion.

In the method of fabricating a semiconductor pressure sensor according to the present invention, an intermediate structure comprising a semiconductor support substrate, an insulating layer provided on the semiconductor support substrate and a semiconductor thin plate formed on the insulating layer is first prepared. Then, a through-hole extending in the thickness direction is formed in the semiconductor support substrate. Thereafter a recess is formed in the insulating layer. The recess is so formed that the thickness of the insulating layer on a position facing the through-hole decreases from the peripheral portion toward the central portion.

EFFECTS OF THE INVENTION

According to the present invention, a semiconductor pressure sensor suppressing both of a measurement error resulting from an offset voltage and a measurement error resulting from a temperature change in the environment is obtained.

The foregoing and other objects, features, aspects and advantages of the present invention will become more apparent from the following detailed description of the present invention when taken in conjunction with the accompanying drawings.

DESCRIPTION OF THE REFERENCE SIGNS 1 silicon support substrate, 1a through-hole, 2 silicon oxide film, 3 silicon thin plate, 4 strain gauge, 5 insulating protective film, 5a hole, 6 aluminum wire, 7 silicon nitride film, 7a opening, 23 diaphragm.

BEST MODES FOR CARRYING OUT THE INVENTION

A semiconductor pressure sensor according to an embodiment of the present invention and a method of fabricating the same are now described with reference to the drawings.

Figure 1:
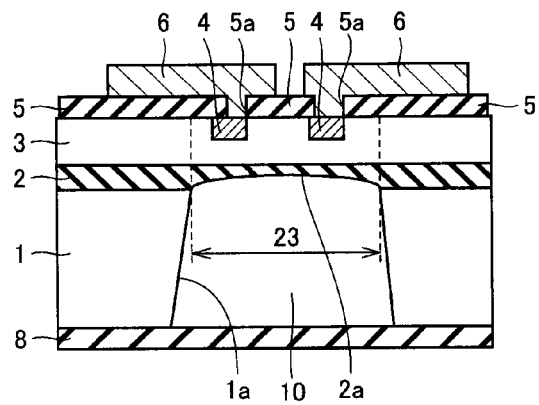
FIG. 1 is a schematic sectional view of a semiconductor pressure sensor according to an embodiment.

FIG. 1 is a sectional view of the semiconductor pressure sensor according to the embodiment. The semiconductor pressure sensor comprises a glass substrate 8 serving as a substrate for sealing, a silicon support substrate 1 serving as a semiconductor support substrate formed on glass substrate 8, a silicon oxide film 2 serving as an insulating layer formed on silicon support substrate 1 and a silicon thin plate 3 serving as a semiconductor thin plate (active layer) formed on silicon oxide film 2. The three-layer structure formed by silicon support substrate 1, insulating layer 2 and silicon thin plate 3 is generally referred to as SOI (Silicon On Insulator).

When the semiconductor pressure sensor is provided with glass substrate 8 as described above, a space sealed up with glass substrate 8, the inner side surface of a through-hole of silicon support substrate 1 and silicon thin plate 3 functions as a pressure reference chamber, whereby an absolute pressure can be measured. When not provided with glass substrate 8, on the other hand, the semiconductor pressure sensor is employed as a differential pressure sensor detecting the difference between the pressures on both surfaces of a diaphragm 23.

In place of the SOI substrate, SOS (Silicon On Sapphire) provided with sapphire between a silicon support substrate and a silicon thin plate may be employed. In this case, sapphire is employed as an insulating layer in place of a silicon oxide film. While the silicon thin plate, the silicon oxide film and the silicon support substrate are employed as the semiconductor thin plate, the insulating layer and the semiconductor support substrate of the present invention, a silicon carbide thin plate, a silicon carbide insulating film and a silicon carbide support substrate may be employed in place thereof. In other words, a semiconductor other than silicon may be employed as the semiconductor constituting the semiconductor pressure sensor.

As shown in FIG. 1, a through-hole 1a reaching silicon oxide film 2 is formed in silicon support substrate 1. Therefore, silicon oxide film 2 faces a space 10 in through-hole 1a. Silicon thin plate 3 and silicon oxide film 2 located on an extension of through-hole 1a are in the form of a thin plate. This thin plate portion functions as diaphragm 23 strained due to the difference between the pressure of the space above silicon thin plate 3 and the pressure of space 10 in through-hole 1a. In order to detect the strain of diaphragm 23, a strain gauge 4 is formed on silicon thin plate 3.

Strain gauge 4 is strained in proportion to deflection of diaphragm 23 when pressure is applied to diaphragm 23 and diaphragm 23 is deflected. When strain gauge 4 is strained, the resistance thereof changes. The resistance of strain gauge 4 changes in proportion to the strain of itself. When a voltage is applied to both ends of strain gauge 4, therefore, the voltage on both ends of strain gauge 4 changes in proportion to the strain of strain gauge 4. When the change of the voltage on both ends of strain gauge 4 is detected, therefore, the pressure applied to diaphragm 23 is detected.

An insulating protective film 5 is formed on silicon thin plate 3. A hole 5a is formed in insulating protective film 5, and the bottom surface of hole 5a is formed by the upper surface of strain gauge 4. An aluminum wire 6 is embedded in hole 5a. Aluminum wire 6 extends on insulating protective film 5. An end of aluminum wire 6 functions as a pad for connection with an external electrode.

As shown in FIG. 1, space 10 enclosed with the upper surface of glass substrate 8, the inner peripheral surface of through-hole 1a and the lower surface of insulating layer 2 functions as a pressure reference chamber in the semiconductor pressure sensor according to this embodiment. In other words, this embodiment is an absolute pressure sensor, space 10 functioning as the pressure reference chamber is a closed space, and the pressure in space 10 is maintained at a prescribed reference pressure. On the other hand, the semiconductor pressure sensor has the following effect, even if the same is not provided with glass substrate 8 but employed as a differential pressure sensor detecting the difference between the pressures on both surfaces of diaphragm 23:

In the aforementioned semiconductor pressure sensor, it is generally ideal that strain gauge 4 detects only the strain of diaphragm 23 resulting from the difference between the pressure on the outer side of diaphragm 23 and the pressure of space 10 in diaphragm 23. However, diaphragm 23 may be strained due to another factor. The strain caused by the other factor results in a measurement error of the semiconductor pressure sensor. In the conventional semiconductor pressure sensor, the silicon oxide film remains under the silicon thin film with a uniform thickness or the silicon oxide film located under the diaphragm is completely removed, to result in the aforementioned measurement error.

In order to suppress the aforementioned pressure error, therefore, silicon oxide film 2 remains over the entire surface of one end of through hole 1a on the lower side of diaphragm 23 while the lower side portion of silicon oxide film 2 is so removed that the thickness of silicon oxide film 2 gradually decreases from the peripheral portion toward the central portion in the semiconductor pressure sensor according to this embodiment. Thus, both of a measurement error resulting from an offset voltage and a measurement error resulting from a temperature change are suppressed. The aforementioned effect attained by the semiconductor pressure sensor according to this embodiment is now described with reference to measurement results.

Figure 2:
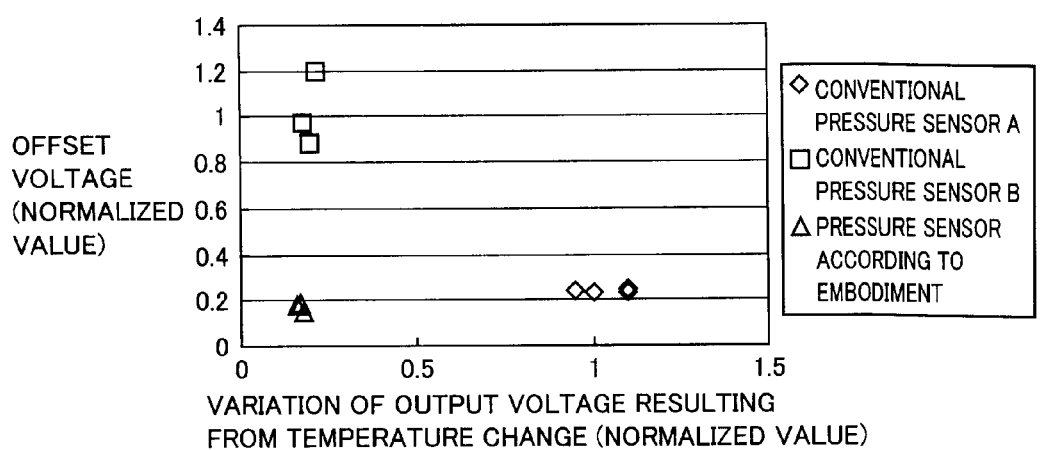
FIG. 2 is a graph for comparing the characteristics of the semiconductor pressure sensor according to the embodiment and those of conventional semiconductor pressure sensors.

FIG. 2 shows the relation between the respective ones of offset voltages and variations of output voltages resulting from temperature changes in the aforementioned two types of conventional semiconductor pressure sensors and an offset voltage and a variations of an output voltage resulting from a temperature change in the semiconductor pressure sensor according to this embodiment.

The offset voltages and the variations of the output voltages resulting from temperature changes in the measurement results shown in FIG. 2 are shown in values normalize by the offset voltages and the variations of the output voltages resulting from temperature changes in the conventional semiconductor pressure sensors respectively. A conventional semiconductor pressure sensor A has the structure of the semiconductor pressure sensor disclosed in Japanese Patent Laying-Open No. 04-009770, and a conventional semiconductor pressure sensor B has the structure of the semiconductor pressure sensor disclosed in Japanese Patent Laying-Open No. 2002-350259.

It is understood from the measurement results shown in FIG. 2 that both of the offset voltage and the variation of the output voltage resulting from the temperature change can be suppressed according to the semiconductor pressure sensor of this embodiment, in comparison with conventional semiconductor pressure sensors A and B.

The method of fabricating the semiconductor pressure sensor according to the embodiment is now described with reference to FIGS. 3 to 8.

Figure 3:
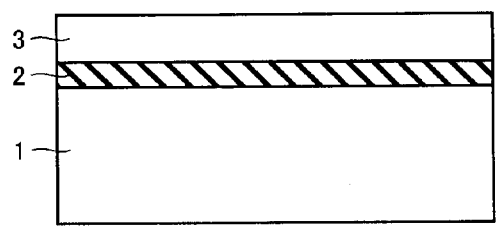
FIG. 3 is a schematic sectional view for illustrating a method of fabricating the semiconductor pressure sensor according to the embodiment.
Figure 4:
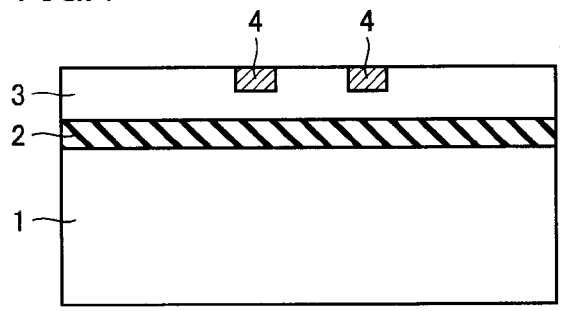
FIG. 4 is a schematic sectional view for illustrating the method of fabricating the semiconductor pressure sensor according to the embodiment.

First, the SOI substrate formed by silicon thin plate 3/silicon oxide film 2/silicon support substrate 1 is prepared, as shown in FIG. 3. Then, strain gauge 4 is formed in silicon thin plate 3 of the SOI substrate, as shown in FIG. 4. Strain gauge 4 is formed by an impurity region diffused in a prescribed depth from the main surface of silicon thin plate 3. Boron, for example, is employed as the impurity constituting strain gauge 4. This impurity is formed in silicon thin plate 3 by thermal diffusion and ion implantation.

Then, insulating protective film 5 is formed on the main surface of silicon thin plate 3 by plasma CVD (Chemical Vapor Deposition). Insulating protective film 5 is preferably a silicon nitride film, for example. Thereafter the portion of insulating protective film 5 located on strain gauge 4 is removed by etching. Thus, strain gauge 4 is exposed on the bottom surface of hole 5a formed in insulating protective film 5.

Figure 5:
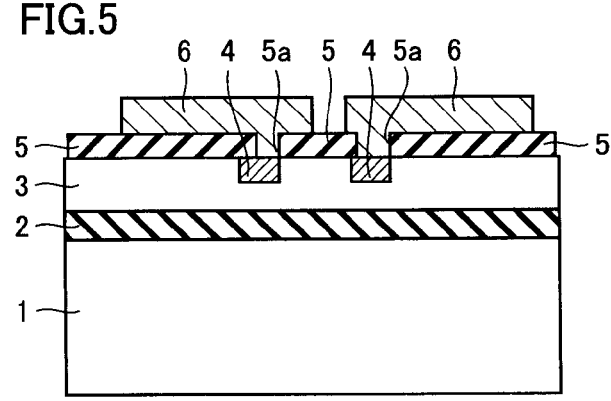
FIG. 5 is a schematic sectional view for illustrating the method of fabricating the semiconductor pressure sensor according to the embodiment.

Then, aluminum wire 6 filling up hole 5a and partially covering the upper surface of insulating protective film 5 is formed. Thus, aluminum wire 6 and strain gauge 4 are electrically connected with each other. FIG. 5 shows the structure obtained through the aforementioned process. Finally, aluminum wire 6 is etched in a prescribed pattern, and the forward end of aluminum wire 6 forms an electrode pad (not shown). Therefore, the semiconductor pressure sensor can be electrically connected to external voltage application means through the electrode pad.

Figure 6:
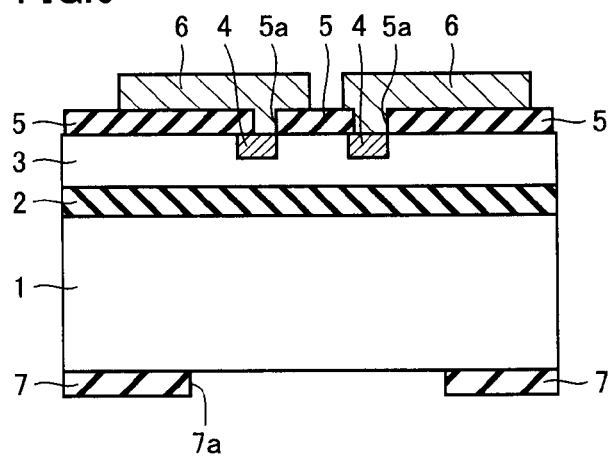
FIG. 6 is a schematic sectional view for illustrating the method of fabricating the semiconductor pressure sensor according to the embodiment.

Then, a silicon nitride film 7 is formed on the main surface of silicon support substrate 1 by CVD. Thereafter an opening 7a is formed in silicon nitride film 7 by plasma etching with reactive gas such as $CF_4$ or $CHF_3$. FIG. 6 shows the structure obtained by this.

Figure 7:
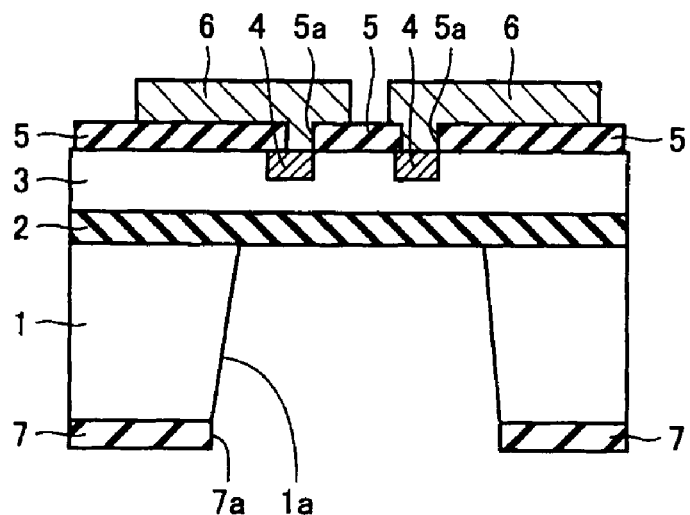
FIG. 7 is a schematic sectional view for illustrating the method of fabricating the semiconductor pressure sensor according to the embodiment.

Then, silicon support substrate 1 is etched through silicon nitride film 7 serving as a mask. Thus, through-hole 1a is formed in silicon substrate 1, and the lower side surface of silicon oxide film 2 is exposed. FIG. 7 shows the structure obtained by this. The section of through-hole 1a parallel to the main surface of silicon substrate 1 may have either a square shape or a circular shape. Through-hole 1a gradually narrows from silicon nitride film 7 toward insulating layer 2.

Wet etching employing a TMAH (tetramethylammonium hydroxide) solution and dry etching employing gas mainly composed of $SF_6$ gas are suitable as methods of etching silicon support substrate 1. In each method, an etchant having a large selection ratio of silicon support substrate 1 with respect to silicon nitride film 7 and silicon oxide film 2 is employed. In other words, an etchant having an extremely large etching rate for silicon substrate 1 with respect to the etching rates for silicon nitride film 7 and silicon oxide film 2 is employed.

Figure 8:
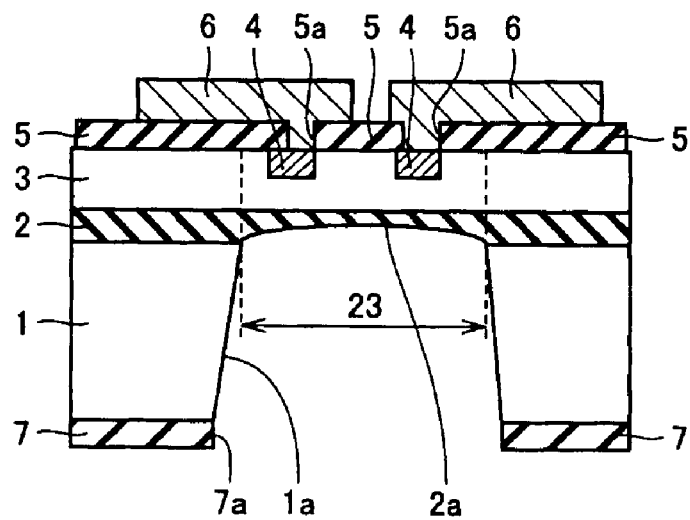
FIG. 8 is a schematic sectional view for illustrating the method of fabricating the semiconductor pressure sensor according to the embodiment.

Then, silicon oxide film 2 is so dry-etched that a recess 2a is formed in silicon oxide film 2, as shown in FIG. 8. Reactive ion etching utilizing reactive gas such as $CF_4$ or $CHF_3$ or ion milling employing argon is suitable as the dry etching method.

While the sectional shape of silicon oxide film 2 obtained by dry etching varies with the gas pressure and a substrate bias voltage in etching and the substrate inclination, silicon oxide film 2 is generally formed in the sectional shape shown in FIG. 1. In other words, silicon oxide film 2 gradually thins from the peripheral portion toward the central portion of diaphragm 23, so that recess 2a formed in silicon oxide film 2 forms part of a substantially spherical surface.

Figure 9:
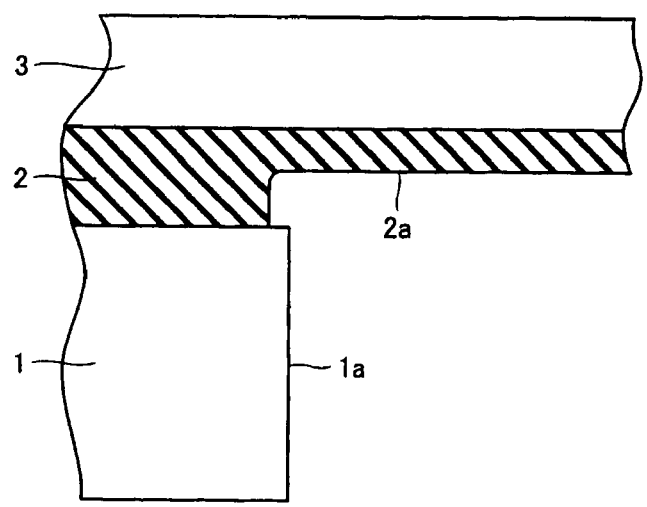
FIG. 9 is a schematic sectional view of a silicon oxide film formed by wet etching.

When silicon oxide film 2 is wet-etched with a hydrofluoric acid solution, on the other hand, silicon oxide film 2 is formed in a sectional shape shown in FIG. 9. In other words, silicon oxide film 2 extends substantially parallelly to silicon thin plate 3 with a constant thickness. In this case, the effect attained by the semiconductor pressure sensor according to this embodiment, i.e., the effect of suppressing the measurement error resulting from the offset voltage and the measurement error resulting from the temperature change is harder to attain as compared with the case where recess 2a is formed by dry etching.

Thereafter silicon nitride film 7 is removed, and glass substrate 8 is anodically bonded to the lower surface of silicon support substrate 1, in order to produce the absolute pressure sensor. Thus, the structure shown in FIG. 1 is obtained. While silicon nitride film 7 may not necessarily be removed, reliability in bonding between silicon support substrate 1 and glass substrate 8 is improved if silicon nitride film 7 is removed when silicon support substrate 1 and glass substrate 8 are anodically bonded to each other. Wet etching employing a hot phosphoric acid solution is suitable as the method of removing silicon nitride film 7.

Figure 10:
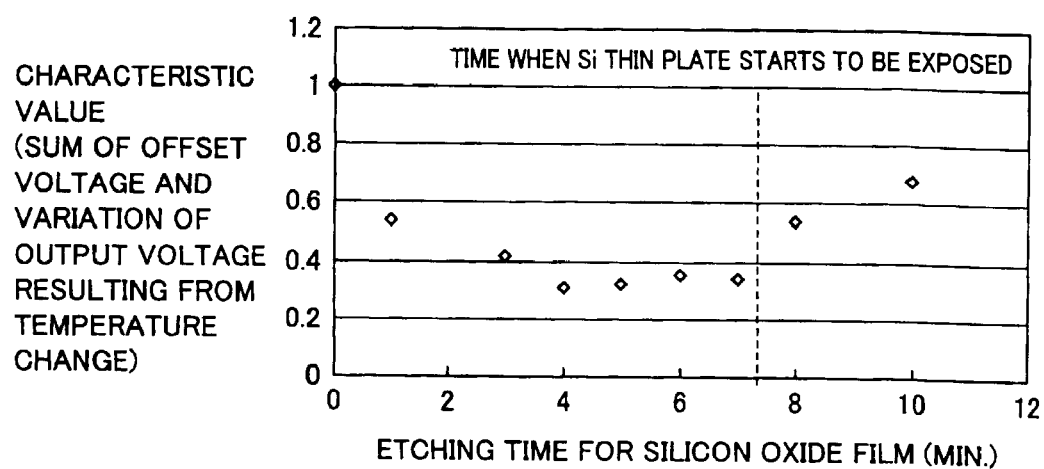
FIG. 10 is a graph showing the relation between an etching time for the silicon oxide film and a measurement error in the semiconductor pressure sensor.

The relation between the sum of the offset voltage and the variation of the output voltage resulting from the temperature change and the etching time for the silicon oxide film was plotted as shown in FIG. 10. In the graph shown in FIG. 10, the conventional semiconductor pressure sensor having the absolutely unetched silicon oxide film, i.e., the semiconductor pressure sensor disclosed in Japanese Patent Laying-Open No. 2002-350259 is employed as the reference. More specifically, the offset voltage normalized with the offset voltage of the semiconductor pressure sensor disclosed in Japanese Patent Laying-Open No. 2002-350259 and the variation of the output voltage resulting from the temperature change normalized with the variation of the output voltage resulting from the temperature change in the semiconductor pressure sensor disclosed in Japanese Patent Laying-Open No. 2002-350259 are employed.

As hereinabove described, the measurement error in the semiconductor pressure sensor is suppressed as the respective ones of the offset voltage and the variation of the output voltage resulting from the temperature change are reduced. In evaluation employing the aforementioned graph shown in FIG. 10, therefore, the measurement error in the semiconductor pressure sensor is suppressed as the sum of the normalized offset voltage and the normalized variation of the output voltage resulting from the temperature change is reduced.

It is understood from FIG. 10 that the measurement error in the semiconductor pressure sensor tends to enlarge if the etching time for silicon oxide film 2 is excessively lengthened. This tendency appears since silicon oxide film 2 is completely removed from the central region of diaphragm 23 and the lower surface of silicon thin plate 3 is exposed if the etching time is excessively long. Silicon oxide film 2 employed for the evaluation shown in FIG. 10 has a thickness of 0.5 μm in an unetched state.

It is also understood from FIG. 10 that the effect of suppressing the measurement error in the semiconductor pressure sensor is attained if silicon oxide film 2 remains along the lower surface of diaphragm 23 although the etching time for silicon oxide film 2 up to exposure of silicon thin plate 3 varies when the thickness of silicon oxide film 2 on the central region of diaphragm 23 is changed. In order to attain the aforementioned effect, therefore, silicon oxide film 2 may remain over the entire lower surface of diaphragm 23.

It is also understood from FIG. 10 that the effect of suppressing the measurement error in the semiconductor pressure sensor is not attained when the etching time approaches zero, i.e., when silicon oxide film 2 is hardly etched but remains in the state formed as the component of the SOI substrate.

Then, quantitative evaluation related to thickness distribution of silicon oxide film 2 was made. In relation to the thickness of silicon oxide film 2, it is assumed that Tmax represents the maximum thickness and Tmin represents the minimum thickness.

Figure 11:
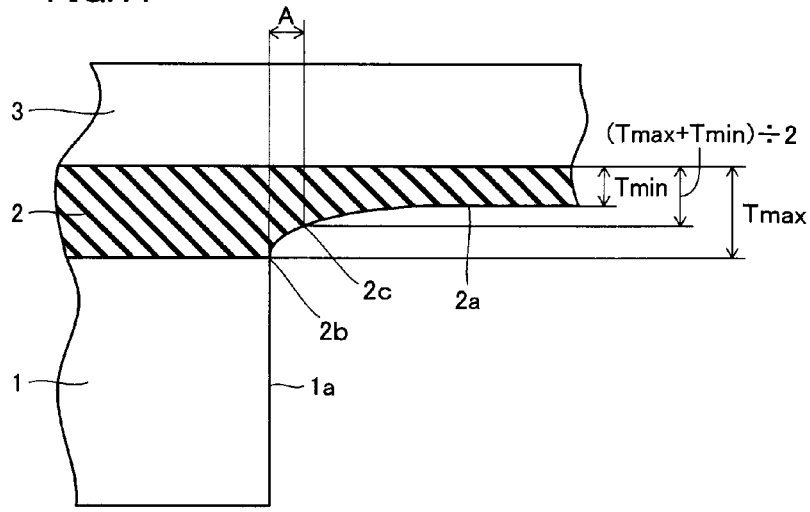
FIG. 11 is a schematic sectional view showing distribution of the thickness of the silicon oxide film.

Further, it is prescribed that A represents the distance between an end 2b of the region where the thickness of silicon oxide film 2 is at the maximum value Tmax and a position 2c where the thickness of silicon oxide film 2 is (Tmax+Tmin)÷2, as shown in FIG. 11.

Figure 12:
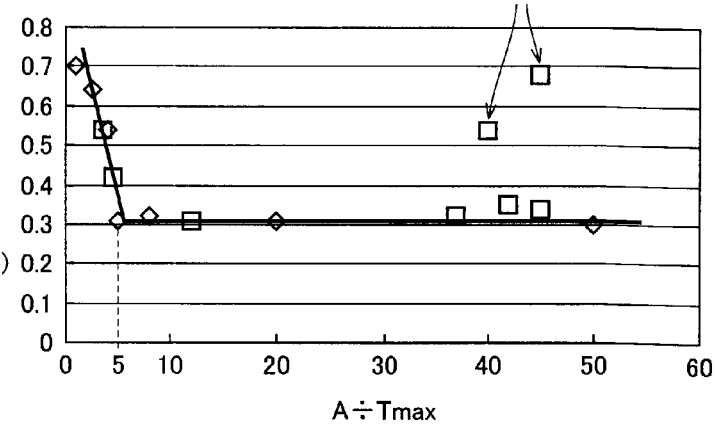
FIG. 12 is a graph showing the relation between the distribution shape of the thickness of the silicon oxide film and the measurement error in the semiconductor pressure sensor.

FIG. 12 shows the relation between the ratio A÷Tmax of distance A with respect to maximum value Tmax and the sum of the offset voltage and the variation of the output voltage resulting from the temperature change. In the measurement for obtaining the results shown in FIG. 12, the quantity of removal of silicon oxide film 2 is fixed to a silicon oxide film removal quantity corresponding to the etching time of 4 minutes in FIG. 10, and only the shape of the thickness distribution of silicon oxide film 2 is changed.

In the evaluation with the graph shown in FIG. 12, a semiconductor pressure sensor having the structure before silicon oxide film 2 of the semiconductor pressure sensor according to this embodiment is etched, i.e., the structure disclosed in Japanese Patent Laying-Open No. 2002-350259 is employed as the reference. More specifically, the sum of the offset voltage normalized with the offset voltage of the semiconductor pressure sensor having the structure disclosed in Japanese Patent Laying-Open No. 2002-350259 and the variation of the output voltage resulting from the temperature change normalized with the variation of the output voltage resulting from the temperature change in the semiconductor pressure sensor having the structure disclosed in Japanese Patent Laying-Open No. 2002-350259 is employed as the index showing the characteristics of the semiconductor pressure sensor.

It is understood from FIG. 12 that the aforementioned effect of suppressing the measurement error is sufficiently attained when such conditions that silicon oxide film 2 remains along the entire region of the lower side of diaphragm 23 and A÷Tmax is at least 5 are satisfied. It is also understood from FIG. 12 that the aforementioned effect of suppressing the measurement error is substantially linearly reduced if A÷Tmax is smaller than 5.

According to the aforementioned semiconductor pressure sensor having silicon oxide film 2 of the sectional shape shown in FIG. 9, i.e., the semiconductor pressure sensor having recess 2a formed in silicon oxide film 2 by wet etching, A÷Tmax is reduced below 5. Therefore, the aforementioned effect of suppressing the measurement error in the semiconductor pressure sensor is hard to attain.

According to the semiconductor pressure sensor of this embodiment, as hereinabove described, silicon oxide film 2 having the thickness distribution continuously decreasing from the peripheral portion toward the central portion of diaphragm 23 is formed along diaphragm 23 while silicon oxide film 2 remains over the entire region of the lower side of diaphragm 23, whereby both of the offset voltage and the variation of the output voltage resulting from the temperature change can be suppressed.

While the measurement error in the semiconductor pressure sensor is suppressed also in the aforementioned case where maximum value Tmax of the thickness of silicon oxide film 2 is larger than 2 μm, the absolute value of the offset voltage before etching of silicon oxide film 2 increases as compared with the case where maximum value Tmax of the thickness of silicon oxide film 2 is not more than 2 μm. In this case, it is difficult to equalize the absolute value of the offset voltage to the absolute value of the offset voltage of the semiconductor pressure sensor provided with silicon oxide film 2 having a small thickness. Therefore, maximum value Tmax of the thickness of silicon oxide film 2 is preferably not more than 2 μm.

Figure 13:
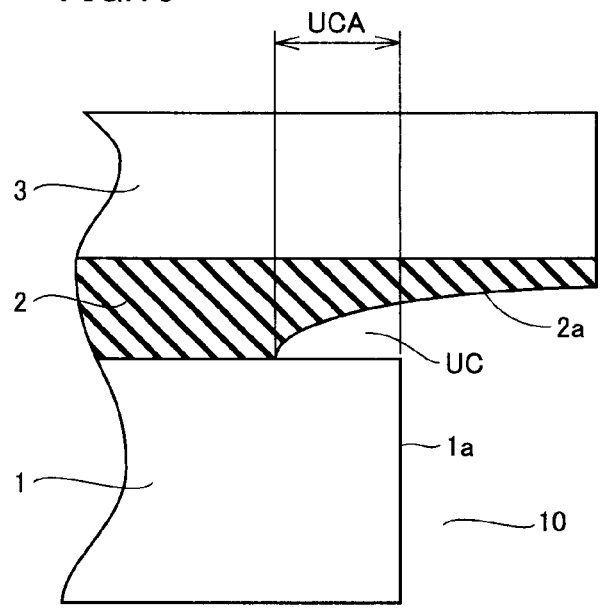
FIG. 13 is a schematic sectional view of another exemplary semiconductor pressure sensor according to the embodiment.
Figure 14:
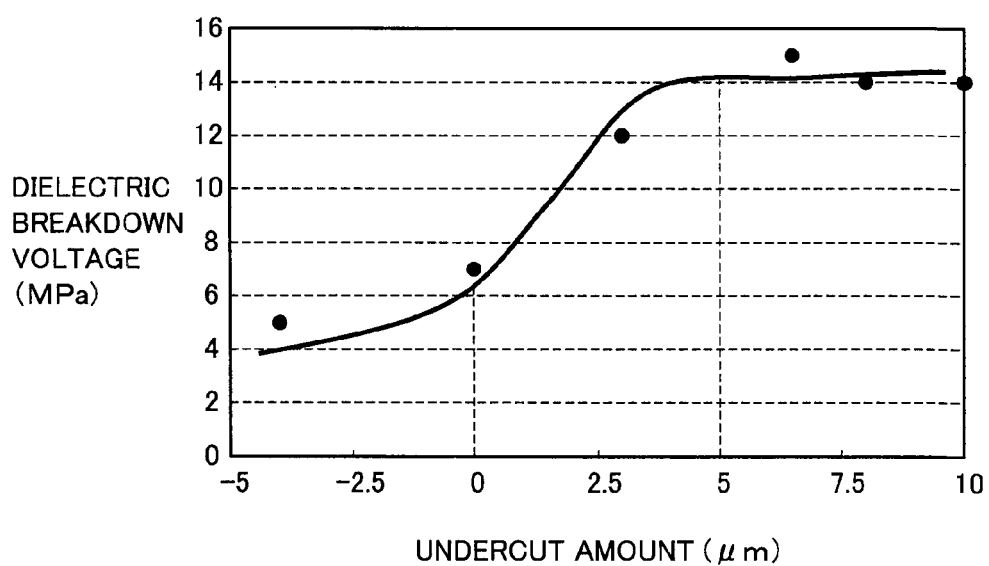
FIG. 14 is a graph showing the relation between the dielectric breakdown voltage of a diaphragm and an undercut amount.

As shown in FIG. 13, the width of recess 2a is preferably larger than the width of the through-hole (1a) in sectional shape. In other words, the peripheral portion of recess 2a is preferably positioned outward beyond the peripheral portion of through-hole 1a. More specifically, the semiconductor pressure sensor preferably has an undercut portion UC extending outward from the periphery of through-hole 1a between silicon support substrate 1 and insulating layer 2, as shown in FIG. 13. The undercut amount UCA shown in FIG. 13 is the distance between the periphery of through-hole 1a and the periphery of recess 2a. According to this, such a result that the dielectric breakdown voltage of the diaphragm is improved is obtained, as shown in FIG. 14. While the reason why such a result is obtained is not yet clear in the present stage, it is inferred that this is because stress concentration caused in silicon oxide film 2 is relaxed.

In consideration of wet etching or dry etching employed for etching the silicon oxide film in the present stage, the maximum value of undercut amount UCA is preferably about 10 μm. It has been confirmed that the dielectric breakdown voltage is improved if undercut amount UCA is not more than 10 μm, as shown in FIG. 14.

The invention claimed is:

1. A semiconductor pressure sensor comprising:
   a semiconductor support substrate provided with a through-hole extending in thickness direction of the substrate;
   a semiconductor thin plate positioned on said semiconductor support substrate; and
   an insulating layer, held between said semiconductor support substrate and said semiconductor thin plate, having a recess on a position facing said through-hole so that the thickness on the position of said recess decreases from the peripheral portion toward the central portion, wherein the insulating layer covers an entire surface of one end of the through-hole while a lower side portion of the insulating layer is removed such that the lower side portion of the insulating layer has a shape which has a portion which is concave facing the through-hole.

2. The semiconductor pressure sensor according to claim 1, wherein

A÷Tmax is at least 5 assuming that A represents the distance between an end of a region where the thickness of said insulating layer is Tmax and a position where the thickness of said insulating layer reaches (Tmax+Tmin)÷2 when Tmax represents the maximum value of the thickness of said insulating layer and Tmin represents the minimum value of the thickness of said insulating layer.

3. The semiconductor pressure sensor according to claim 2, wherein the maximum value Tmax of the thickness of said insulating layer is not more than 2 μm.

4. The semiconductor pressure sensor according to claim 1, wherein

The peripheral portion of said recess is positioned outward beyond the peripheral portion of said through-hole.

5. A method of fabricating a semiconductor pressure sensor, comprising:

preparing an intermediate structure comprising a semiconductor support substrate, an insulating layer provided on said semiconductor support substrate and a semiconductor thin plate formed on said insulating layer;

forming a through-hole extending in a thickness direction in said semiconductor support substrate; and forming a recess in said insulating layer so that the thickness of said insulating layer on a position facing said through-hole decreases from the peripheral portion toward the central portion, wherein the insulating layer is formed to cover an entire surface of one end of the through-hole while a lower side portion of the insulating layer is removed such that the lower side portion of the insulating layer has a shape which has a portion which is concave facing the through-hole.

6. The method of fabricating a semiconductor pressure sensor according to claim 5, wherein said recess is formed by dry-etching said insulating layer.

7. The method of fabricating a semiconductor pressure sensor according to claim 5, wherein the peripheral portion of said recess is positioned outward beyond the peripheral portion of said through-hole in the step of forming said recess in said insulating layer.

* * * * *